(12) United States Patent
Gerrish et al.

(10) Patent No.: US 6,261,618 B1
(45) Date of Patent: *Jul. 17, 2001

(54) METHOD OF MAKING BATTERED AND BREADED FOOD COMPOSITIONS USING CALCIUM PECTINS

(75) Inventors: Timothy Gerrish, Kennett Square, PA (US); Camille Higgins, Rockford; Kay Kresl, Rockton, both of IL (US)

(73) Assignee: Hercules Incorporated, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/740,973

(22) Filed: Nov. 5, 1996

Related U.S. Application Data

(63) Continuation of application No. 08/453,423, filed on May 30, 1995, now Pat. No. 5,601,861.

(51) Int. Cl.$^7$ .................................................. A23L 1/0524
(52) U.S. Cl. .............................. 426/303; 426/89; 426/92; 426/94; 426/102; 426/302; 426/575; 426/577
(58) Field of Search ................................ 426/89, 102, 92, 426/303, 271, 273, 302, 304, 438, 573, 575, 577, 804, 94

(56) References Cited

U.S. PATENT DOCUMENTS 5,601,861 * 2/1997 Gerrish et al. ........................ 426/303

FOREIGN PATENT DOCUMENTS

0487340A1 * 5/1992 (EP) .

* cited by examiner

*Primary Examiner*—Lien Tran
(74) *Attorney, Agent, or Firm*—Caesar, Rivise, Bernstein, Cohen, & Pokotilow, Ltd.

(57) ABSTRACT

A method and composition for preparing battered and breaded food compositions which resist absorbing oil during deep fat frying. The breading composition is prepared by enriching the breading formulation with calcium. This is accomplished by either dry blending, spray drying or agglomerating (e.g., spray coating or application with subsequent drying), by baking the calcium source into the bread crumb or any combination of the above. The battered and breaded food composition is then treated, with a solution of calcium reactive pectin. The calcium-pectin coating functions to significantly impede the absorption and adsorption of frying oil, increases the moisture content, the crispness and heat lamp stability of the food composition. Alternatively, the food may first be treated with the calcium reactive pectin and then the calcium source, depending upon the circumstances of use.

60 Claims, 4 Drawing Sheets

N is an integer from 200 to 800

X is independently selected N times from $-\overset{O}{\underset{\|}{C}}-OM, -\overset{O}{\underset{\|}{C}}-NH_2$ M is $H^+, Na^{+2}, Ca_3$ ,CH N is an integer from 200 to 800

X is independently selected N times from $-C(=O)-OM, -C(=O)-NH_2$

N is an integer from 35 to 135

N is an integer from 35 to 135

METHOD OF MAKING BATTERED AND BREADED FOOD COMPOSITIONS USING CALCIUM PECTINS

This application is a continuation of prior filed application Ser. No. 08/453,423 filed May 3, 1995 now U.S. Pat. No. 5,601,861.

BACKGROUND OF THE INVENTION

1 Field of Invention

This invention relates to deep fat fried, battered and breaded foodstuffs and to their method of preparation. More specifically, this invention relates to the production of deep fat fried, battered and breaded products which absorb/adsorb significantly less fat during cooking than conventional battered and breaded products. The method of the present invention has in its preferred form a series of process steps which are carried out without a drying step.

2. The Prior Art

Comestibles such as meat, fish, poultry and vegetables are commonly batter coated, breaded and then cooked by deep fat frying. In particular, foodstuffs are batter coated, breaded, par fried and then frozen. The frozen, par fried products are then reconstituted for consumption by either deep fat frying or oven baking. Alternately, the battered and breaded foodstuffs are frozen raw and reconstituted for consumption by deep fat frying. It is well known to form a film or barrier around such food products to lessen the penetration into such food products of frying fat or cooking oil. However, only modest reductions in absorbed/adsorbed cooking oil have been achieved. The following prior art is exemplary of such films or barriers.

U.S. Pat. No. 4,504,502 (Earle) describes a process for preparing a food product made by applying an aqueous dispersion containing water soluble algin to the surface of a food substrate and applying a dry gelling mixture to the algin-coated food substrate for a period of time sufficient to form a substantially continuous edible film along the food product surface.

U.S. Pat. Nos. 4,877,626 and 5,057,329 (Stypula et al.), disclose a composition and process for preparing coatings for macerated meat compositions which reduces absorption or adsorption of cooking oil on storage and/or cooking. The barrier composition is composed of starch, methylcellulose and xanthan gum.

U.S. Pat. No. 4,219,575 (Saunders et al.), discloses a process of preparing frozen french fried potatoes using modified food starches, when prepared by microwave methods, have an improved crisp texture. The applications outlined by Saunders are surface treatment applications directed toward the improvement of texture and eating quality of microwave heated products, but not for the purposes of oil reduction.

U.S. Pat. No. 4,900,573 (Meyers) discloses the use of specific hydroxypropylmethyl cellulose food gums to inhibit the absorption of oil in batter coated fried foods. The oil barrier effect appears to be accomplished by mixing the synthetic food gum directly with a batter composition.

U.S. Pat. No. 4,876,102 (Feeney et al.) discloses the use of water absorbent cellulosic fibers, high in pectin, such as albedo fiber or juice sac fiber, to prepare improved fried potato products made from dehydrated potato dough. Feeney's invention is directed toward improved workability of potato dough, the improved texture and flavor of dough-based fried foods after frying and the retention of crispness of the products after microwave reheating.

U.S. Pat. No. 5,279,840 (Braisier et al.), discloses a method of producing reduced fat non-breaded, deep-fried comestibles such as french fries. The method applies to preparing french fries by coating with a mixture of a starch such as ungelatinized amylose (containing amylose and amylopectin) and calcium, blanching, dehydrating and par frying the coated comestible. The comestible thus treated can be frozen and stored or immediately finish fried. Disclosure is made of a calcium pectin/pectate reaction and its possible role in the reduction of oil. It is believed that in this disclosure the pectin/pectate is part of the raw potato tissue and is not added or enriched in pectin/pectate by a separate treatment step. Cited in the '840 patent is U.S. Pat. No. 5,279,840 which is stated to disclose the use of calcium added to potatoes to prevent blistering, with the additional claim that low amounts of calcium produces potatoes which are generally less oily than their blistered counterparts.

U.S. Pat. No. 5,372,829 (Chalupa et al.), discloses the use of gellan gum as a component of a batter composition or as a component of the breader composition and their use in reducing the amount of oil that is absorbed by foods coated with these materials. Disclosure is also made of the use of sodium and calcium salts as a component of the gellan-containing batter and the spray coating of bread crumbs with a solution of gellan containing sodium or calcium salts.

U.S. Pat. No. 5,232,721 (Polansky) discloses an improved method for drying foodstuffs which will minimize the uptake of the frying medium by using naturally occurring edible polymers chosen from the group consisting of proteins, carbohydrates and modified carbohydrates, drying the coating and frying the coated foodstuff.

U.S. Pat. No. 4,511,583 (Olson et al.), discloses the use of gelatin or certain starches and methods for preparing battered and breaded comestibles, e.g., fish, and fried food products prepared therefrom which exhibit reductions in cooking oil absorbed during frying. The coating can be dried prior to frying using forced hot air drying ovens.

Gerrish et al., European Publication 487,340 describes a procedure for frying potatoes, chicken, egg rolls and dough which requires pre-coating the food with a low molecular weight pectin, alginate and/or methylcellulose.

European Patent No. 048123 (Merck & Company, Inc.) discloses a gelled algin emulsion comprising 0.05 to 5.0 weight percent algin, 0.05 to 25 weight percent emulsifier, 0.05 to 20 weight percent oil or fat, and 0.001 to 0.5 weight percent of divalent or trivalent metal ions.

British Patent No. 1,079,628 (Dow Chemical Co.) discloses a process for preparing fried potato products where the whole potato pieces are blanched with an aqueous solution of a film forming synthetic or chemically modified natural hydrocolloid to form a thin coating of the hydrocolloid on the potato surface and then frying the potato.

Research Disclosure No. 18237, published Jun. 19, 1979, discloses a process for permitting the setting of batter in hot water. The batter, containing alginate, is coated onto a food product in the normal way and the product is then immersed in a hot aqueous solution of polyvalent metal salt such as calcium chloride. The high temperature sets the batter by gelatinizing the starch component and the batter is protected while it is setting, by the formation of an insoluble alginate skin or gel. This insoluble alginate skin or gel is formed by chemical reaction between the soluble alginate in the batter and the polyvalent metal salt in the setting bath. The coated product is then rinsed in cold water and dried.

In pending application serial number 08/003,769, filed Jan. 13, 1993, (inventors Timothy Gerrish and Lawrence Carosino), assigned to Hercules Incorporated, one of the assignees of the present invention, entitled low oil food composition and method, is disclosed a composition and method for preparing low oil fried potato foods. That application also relates to ASN 07/616,474, filed Nov. 21, 1990.

The Aqualon Company markets methylcellulose and methylhydroxypropyl cellulose as an ingredient for use in the preparation of matrix potato and meat products which absorb less oil during deep fat frying. Again, the oil barrier effect is accomplished by mixing the synthetic food gum directly with a batter or matrix food composition. No disclosure is made for the use of calcium reactive pectins in this application.

The James River Corporation markets a microcrystalline cellulose product which they disclose as a batter additive which impedes the absorption of oil during deep fat frying. Examples of fried donuts are given in their promotional literature. James River Corp. does not disclose the use of calcium reactive pectins in donut applications.

No prior art, of which the present inventors are aware, discloses the use of calcium reactive pectins used in combination with calcium as a method of reducing the oil absorption of deep fat fried, battered and breaded food or matrix food compositions.

Accordingly, the present invention has the feature of providing calcium reactive pectins used in combination with calcium as a method of reducing the oil absorption of deep fat fried, battered and breaded food, or matrix food compositions. All features of this invention are accomplished in the absence of a separate drying step of the pectin coating.

This invention also has the feature of providing a method of and compositions for reducing oil absorption of deep fat fried, battered and breaded food, or matrix food compositions.

This invention also has the feature of achieving a method of and compositions for reducing oil absorption of deep fat fried, battered and breaded food, or matrix food compositions which minimizes deep fat fryer disturbance.

This invention further provides a method of and compositions for reducing oil absorption of deep fat fried, battered and breaded food, or matrix food compositions which improves the texture of the food product.

This invention also provides a method of and compositions for reducing oil absorption of deep fat fried, battered and breaded food, or matrix food compositions in the preferred embodiment reduces the loss of batter/breading from the coated food product in the fryer, thereby increasing the useful life of fryer oil.

This invention has the feature of achieving a method of and compositions for reducing oil absorption of deep fat fried, battered and breaded food, or matrix food compositions which reduces the loss of batter/breading from the coated food product during frozen transport of the product.

This invention also has the feature of achieving a method of and compositions for reducing oil absorption of deep fat fried, battered and breaded food or matrix food compositions which maintains batter integrity such as adhesion properties of the batter during pre-frying, during frying and while steam cooking.

SUMMARY OF INVENTION

A method and composition are disclosed for preparing battered and breaded food compositions which resist absorbing oil during deep fat frying. In the preferred embodiment, the breading composition is prepared by enriching the breading formulation with calcium. This is accomplished by either dry blending, spray drying or agglomerating (e.g., spray coating or application with subsequent drying), by baking the calcium source into the bread crumb or any combination of the above. The battered and breaded food composition is then treated, with a solution of calcium reactive pectin. The calcium-pectin coating functions to significantly impede the absorption and adsorption of frying oil and increases the moisture content In addition, this coating technology may impact the crispness and heat lamp stability of the food composition. Alternatively, the food may first be treated with the calcium reactive pectin and then the calcium source applied thereto, depending upon the circumstances of use.

In a second embodiment of the invention the foodstuff is first coated with a batter composition which includes a calcium salt. Then, the batter coated foodstuff is coated with a bread crumb composition which includes the pectin being dispersed throughout the bread crumb composition.

In a third embodiment of the invention the first step involves coating the foodstuff with a batter composition which includes the pectin. Then, the batter-coated foodstuff is coated with a calcium salt enriched bread crumb composition.

In a fourth embodiment of the invention the foodstuff is first coated with batter and then coated with bread crumbs which include the pectin dispersed throughout the crumbs followed by applying an aqueous solution of the calcium salt.

DESCRIPTION OF THE DRAWINGS

Other objects and many attendant features of this invention will become readily appreciated as the same becomes better understood by reference to the following detailed description when considered in connection with the accompanying drawings wherein:

FIG. 1 is a representative structural formula showing the limits of the pectin types which are utilized in the present invention, i.e., low methoxy pectins, low methoxy amidated pectins, and the molecular weight ranged included. In FIG. 1, N is an integer from 200 to 800, x is independently selected N times from —COOM and $CONH_2$, and M is $H^+$, $Na^+$, $Ca^{+2}$ and $CH_3$.

DETAILED DESCRIPTION OF THE PREFERRED EMBODIMENTS

This invention relates to a process for preparing reduced fat battered and breaded food compositions. Reduction of fat/oil in deep fat frying applications of battered and breaded foods and/or matrix food products is, at least, partly a function of the products ability to function as a physical barrier to oil migration into the batter and breading and to resist water loss during the frying cycle. Improved quality and reduced oil, deep fat fried battered and breaded food compositions, and method to manufacture same is disclosed.

This invention also relates to the preparation of battered and breaded food compositions which resist the absorption of oil during deep fat frying. The breading composition is prepared by enriching the breading formulation with calcium. This is accomplished by either dry blending, spray drying or agglomerating (e.g., spray coating or application with subsequent drying), by baking the calcium source into the bread crumb or any combination of the above. The battered and breaded food composition is treated, either by dip, spray or other such methods known in the art, with a solution of calcium reactive pectin. The calcium-pectin coating functions because of the formation of a pectin film, to significantly impede the absorption and adsorption of frying oil, increases the moisture content, the crispness and heat lamp stability of the food composition. The absence of a drying step is the preferred embodiment of the invention.

The present invention is contemplated for use with typical coated comestibles, i.e., breaded food articles including battered and breaded food articles. Any food substrates which are coated with bread crumbs and are intended to be deep-fat fried or par fried would be included in this invention. Such food substrates include fish, seafood, red meat, poultry, pork, fruits, vegetables, etc.

After the appropriate preparation of the food substrate, cutting to size, washing, thermal tempering, pre-dusting, etc., the substrate is coated with a conventional liquid batter such as an adhesive batter designed for the subsequent application of a breading. The batter is applied by conventional batter application equipment which includes curtain/waterfall/cascade application or tempura/submersion/immersion application.

The batter type, viscosity, pick up, density and water/solids ratio are dependent on the substrate being prepared. These will vary depending on the processor's needs, as well as the USDA requirements for the breading of this substrate. For this invention, the ingredients of the batter may incorporate either calcium or pectin, but not both, since gelation would result if both were present.

The bread crumb used in this invention include the conventional breading materials known in the industry and include ground cracker meal, American Bread Crumbs (ABC), Japanese Bread Crumbs (JBC), flour breader and any combination of the above.

One of the features of this invention is the bread crumb and its composition or its treatment to allow it to be part of the pectin gelling or film forming reaction. In the present invention, the bread crumb is treated with a soluble calcium salt by either dry blending, spray coating, agglomerating or baking the calcium into the bread composition used to make the final crumb. The calcium present in a bread crumb or cracker meal so produced, will react/cross-link/gel with calcium reactive pectins to form a hydrophilic/oleophobic gel/coating/film which resists the absorption and adsorption of oil in the frying step. The level of calcium in the bread crumbs is critical in that it is important to provide sufficient available calcium for efficient reaction with the pectin. This can be characterized by defining the amount of calcium present in the crumb for reaction on a milligram (mg) per gram of pectin basis. The preferred level would be 50 to 1000 mg of calcium ion per gram of pectin. The more preferred level would be 200 to 800 mg of calcium ion per gram of pectin. The most preferred level would be 400 to 600 mg of calcium ion per gram of pectin.

The calcium treated bread crumb is produced by either dry blending a fine mesh calcium chloride, calcium citrate, calcium phosphate or any other water soluble calcium salt to the flour portion of the bread dough or brought into solution and added to the flour. The level of calcium salt is calculated using the preferred level of calcium ion per gram of pectin, described above. For the use of calcium chloride, 0.28–0.48% by dry ingredient weight calcium chloride is added to obtain the proper ratio. For example, 4.8 mls of a calcium chloride solution having a concentration of 10% can be added to 100 grams of flour. Calcium solutions having concentrations in the range of 10% to 50% may be utilized in the present invention, although varying concentrations can be used depending upon the circumstances of use.

Another feature of this invention is the treatment of the battered and breaded comestible with a solution of calcium reactive pectin. The pectin type is selected from the group which includes Conventional Low Methoxy pectins (LMC pectins) and Amidated Low Methoxy pectins (LMA pectins). All pectins selected from these types are effective at reducing the oil level of deep fat fried, battered and breaded comestible prepared as described above. The oil barrier performance, the extent of oil reduction, is dependent on the specific types of pectin selected, their degree of esterification (DE) and/or degree of amidation (DA) and their molecular weight (MW). The most effective pectins for use in the present invention have a high molecular weight and a high calcium reactivity, which is characterized by a low degree of esterification (0–40%).

The preferred pectin types are those characterized by very strong or high calcium reactivity, termed calcium sensitivity. The preferred pectin types being the LMC pectins with a degree of esterification (DE) in the range 0 to 40%, the more preferred pectin types being the LMC pectins with a DE in the range of 0 to 25%, the most preferred pectin types being the LMC pectins with a DE in the range 0 to 15%. The MW is also a critical feature of the oil barrier or reduction performance of these pectins. The preferred pectin types being the LMC pectins with a MW greater than 50,000 daltons, the more preferred pectin types being the LMC pectins with a MW greater than 100,000 daltons and the most preferred pectin types being the LMC pectins with a MW greater than 150,000 daltons.

Two of the most effective pectins which may be used with the present invention are commercially available from Hercules Incorporated, Wilmington, DE. Those two pectins are known as the Hercules Genu pectin type LM1912CSZ and Hercules Genu Pectin LM110Z.

Figure 1:
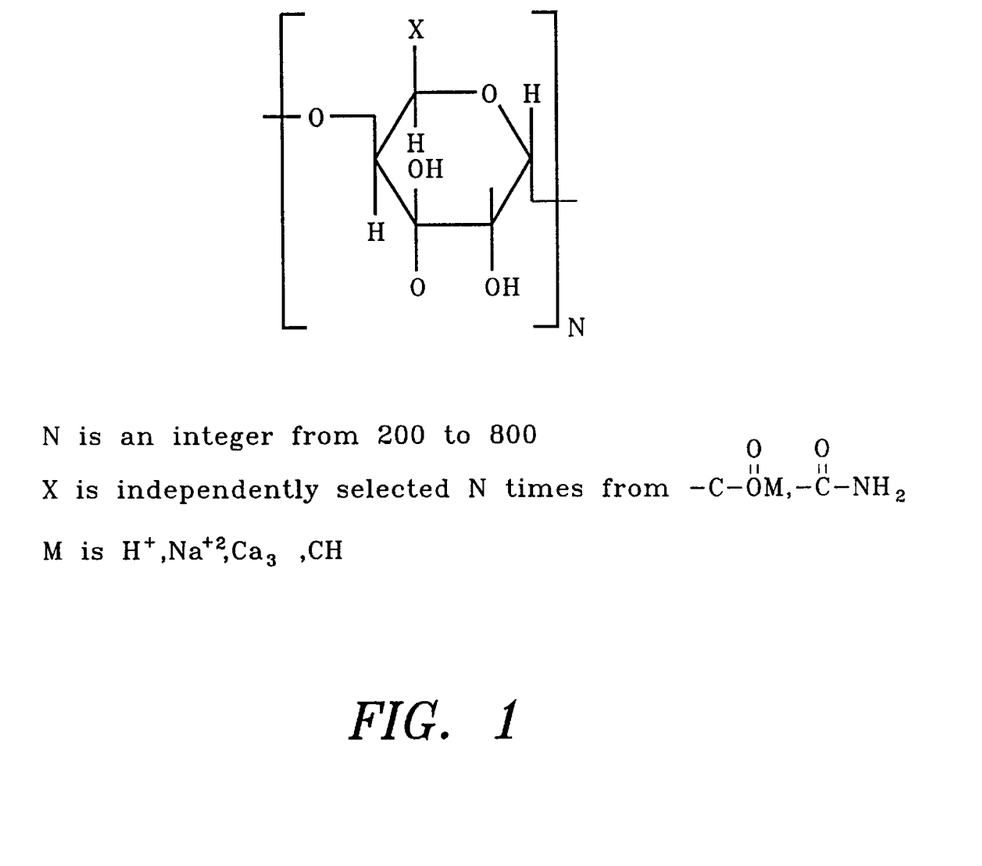

FIG. 1 shows a representative structural formula showing the limits of the pectin types which are utilized in the present invention, i.e., low methoxy pectins, low methoxy amidated pectins, and the molecular weight ranged included. Since the selection of X is independent of the value of N which would result in high methoxy pectins being included in the structural formula, the degree of esterification and degree of amidation are spedified where applicable in FIGS. 2–4 as a distinguishing feature.

In FIG. 1, N is an integer from 200 to 800, x is independently selected N times from —COOM and $CONH_2$, and M is $H^+$, $Na^+$, $Ca^{+2}$ and $CH_3$.

Figure 2:
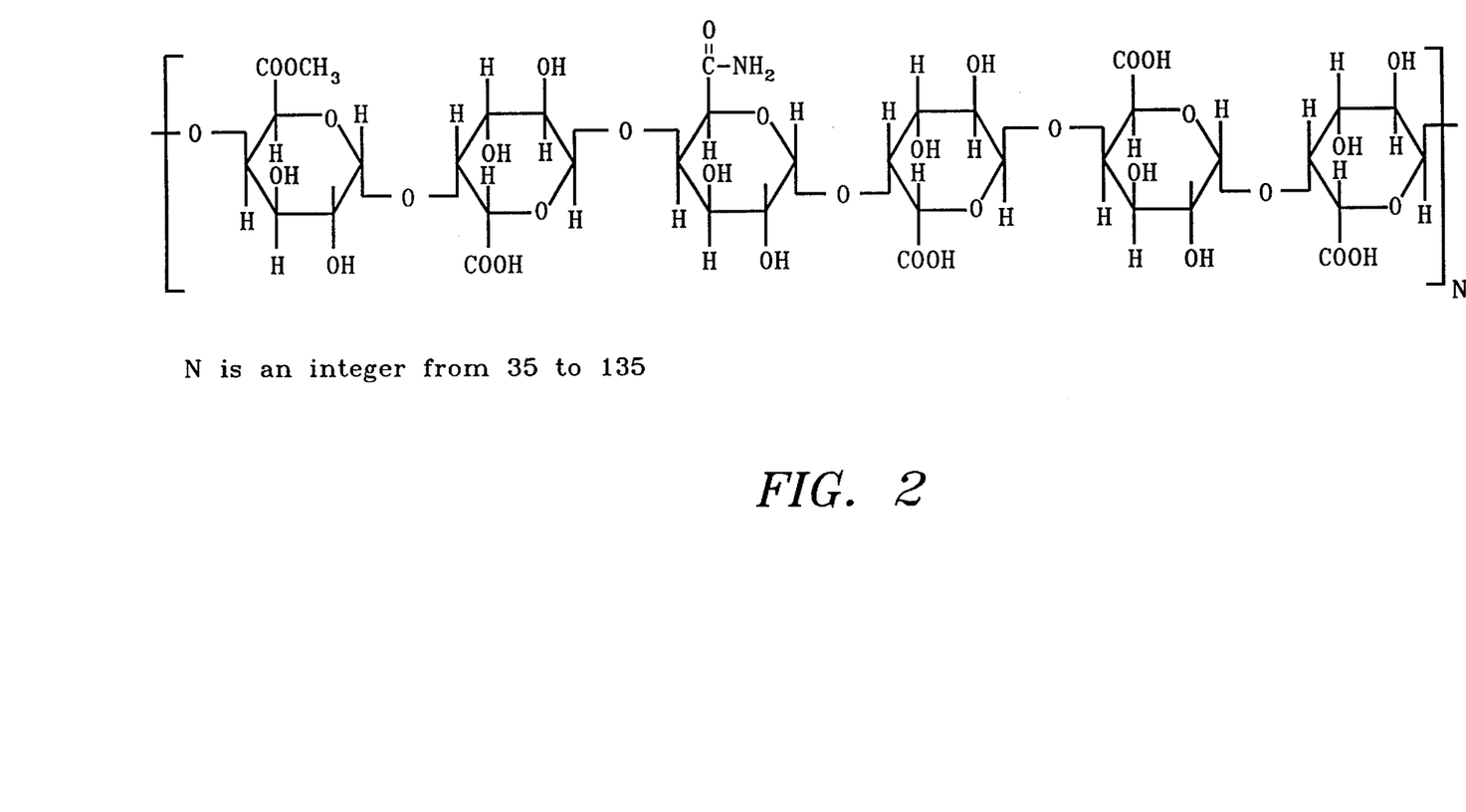
FIG. 2 shows the low methoxy amidated pectin known by the LM 110 ASZ designation of Hercules Incorporated, where N is an integer from 35 to 135, with a degree of esterification of 16.7% and a degree of amidation of 16.7%.

FIG. 2 shows the low methoxy amidated pectin known by the LM 110 ASZ designation of Hercules Incorporated, where N is an integer from 35 to 135, with a degree of esterification of 16.7% and a degree of amidation of 16.7%. When N is 35, the molecular weight is approximately 41,000 and when N is 135, the molecular weight is approximate 150,000.

Figure 3:
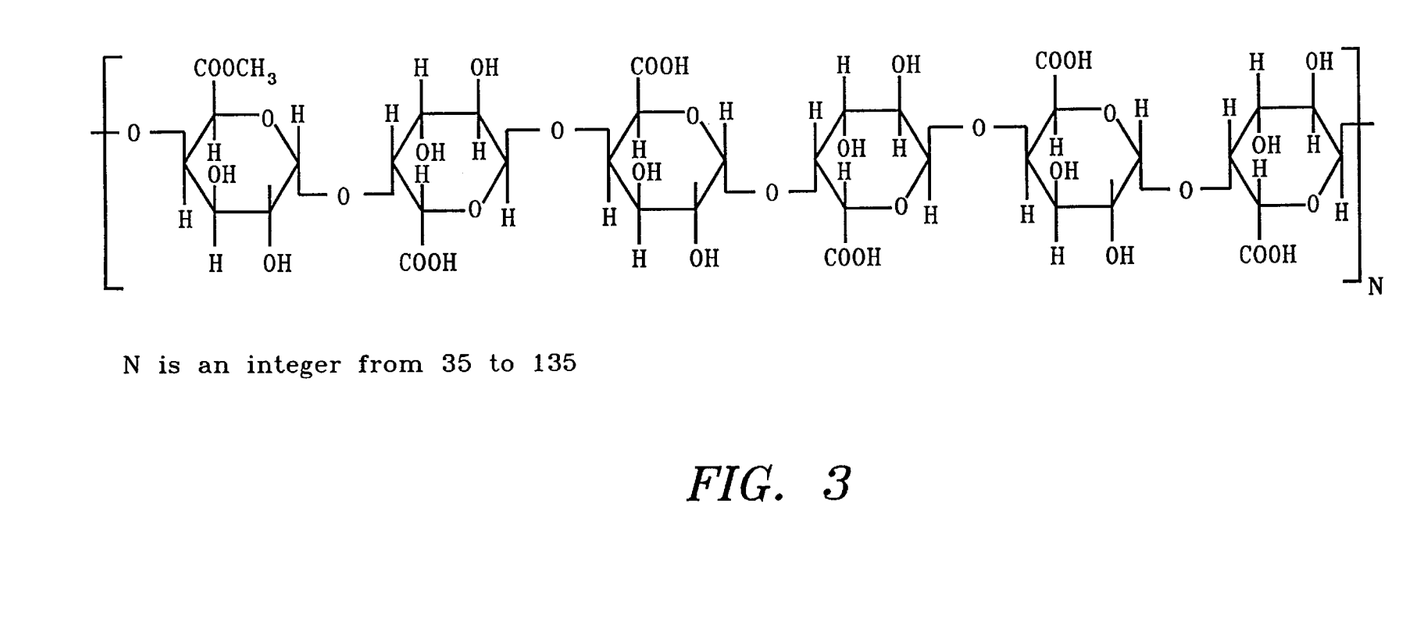
FIG. 3 shows the low methoxy pectin known by the LM 110 Z designation of Hercules Incorporated, where N is an integer from 35 to 135, with a degree of esterification of 16.7%.

FIG. 3 shows the low methoxy pectin known by the LM 110 Z designation of Hercules Incorporated, where N is an integer from 35 to 135, with a degree of esterification of 16.7%.

Figure 4:
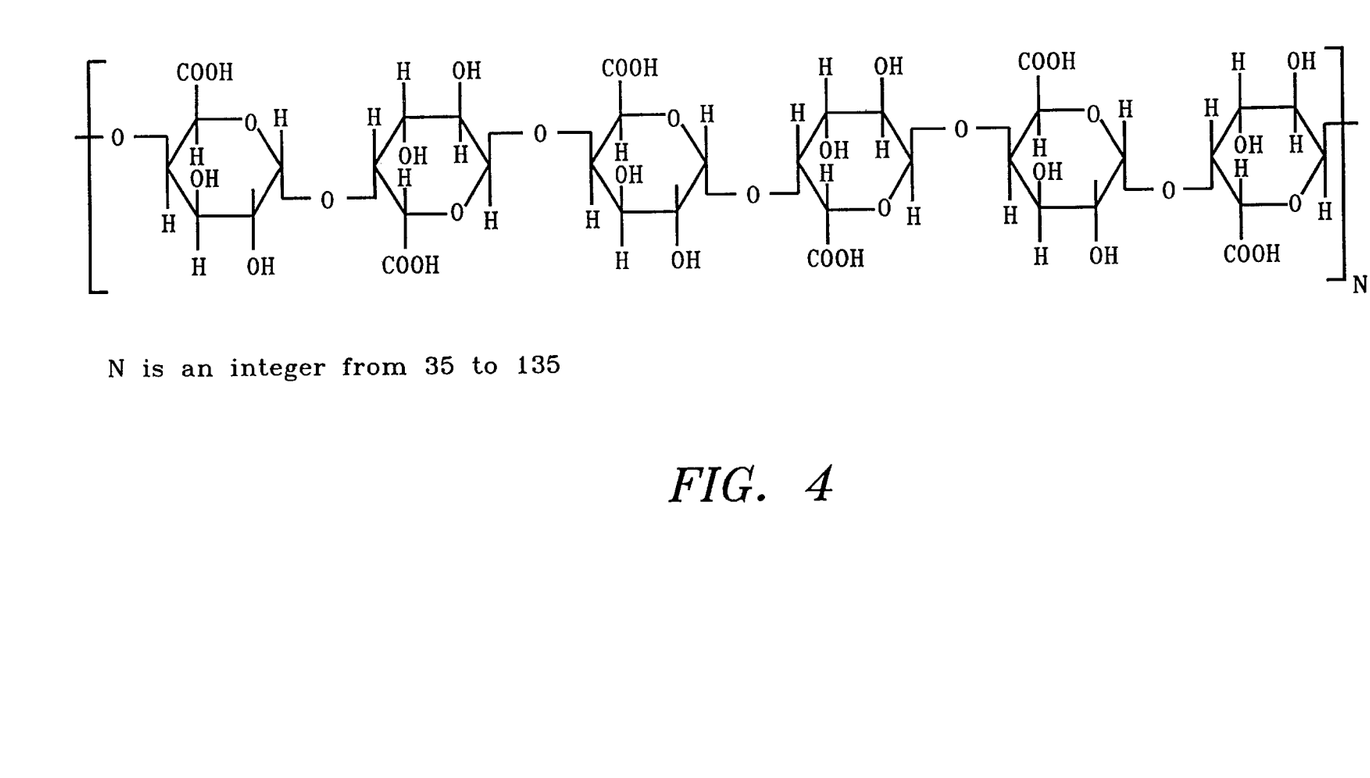
FIG. 4 shows the low methoxy pectin known by the LM 1912 CSZ designation of Hercules Incorporated, where N is an integer from 35 to 135, with a degree of esterification of 0.0%.

FIG. 4 shows the low methoxy pectin known by the LM 1912 CSZ designation of Hercules Incorporated, where N is an integer from 35 to 135, with a degree of esterification of 0.0%.

In addition, the pectin treatment process impacts the oil barrier performance of the coating. Pectin treatment concentration, pectin treatment time and temperature, method of application all impact the oil barrier or oil reduction performance of the pectin treatment.

PRELIMINARY CONSIDERATIONS

1. Preparation of Dry Blended Bread Crumbs

Dry blended bread crumbs are produced by post-blending a specified amount of fine mesh calcium salt to the previously prepared crumbs.

2. Preparation of Spray Dried/Agglomerated Bread Crumbs

Spray dried/agglomerated bread crumbs are produced by evenly spraying the bread crumbs with a calcium salt solution and then redrying the bread crumb to its specified moisture level.

3. Preparation of calcium enriched (Baked-in) Bread Crumbs

Calcium enriched bread crumbs are produced by either blending a fine mesh calcium salt or a solution of calcium salt into the flour portion of the dough. The flour is then used to produce the bread crumb.

4. Preparation of calcium enriched (Baked-in) Bread Crumbs surface treated with pectin (Dry Blended or Spray coated)

Calcium enriched bread crumbs are produced by either blending a fine mesh calcium salt or a solution of calcium salt into the flour portion of the dough. The flour is then used to produce the bread crumb. These bread crumbs are then dry blended with pectin or over sprayed with a pectin solution to evenly coat the calcium enriched crumb with pectin. This system would be activated by dipping the breaded substrate in a water dip to solubilize both the calcium salt and the pectin which would allow the cross-link reaction to occur.

5. Technique for Measuring Fat Absorption by Gravimetric Means Employing Automated Fat Extraction and Microwave Drying:

An AVC-80 Microwave moisture and fat analysis system, available form the CEM Corporation, is used for the determination of moisture and fat content of deep fat fried food products described in the Examples section of this document. The CEM AVC-80 Moisture analyzer and Fat Extractor provides a moisture and fat analysis in less than 15 minutes, using official (AOAC) methods. The AOAC methods for determining fat are disclosed in a publication by AOAC International, The Referee, Vol. 16, No. 9, September 1992, the entire disclosure of which is incorporated by reference herein.

The sample is prepared by grinding and then dried in the microwave moisture analyzer to constant weight. The dried sample is then transferred to the extractor where the fat is automatically removed using a rapid solvent extraction. The extractor performs the solvent extraction of fat from the sample using mechanical agitation and solvent circulation. The non-fat solids of the extracted sample are collected by the extractor on a filter disk. The solids are next returned to the microwave moisture analyzer and dried. The weight lost during the extraction is the amount of fat present in the sample. The analyzer gives a direct readout of moisture and fat content and prints the data to an archive database or prepares a hard copy for filing.

6. Reduced Fat, Battered and Breaded Comestibles.

EXAMPLE #1

Fish Portions

Control

Tempered frozen fish portions are dusted with a pre-dust composition typical in the industry and then dipped in a commercially available adhesion batter (Kerry Ingredients, Golden Dipt Coating Division designation #G6046) using a Stein batter application unit. The battered fish portion is then coated with commercially available bread crumbs for example, using bread crumbs from Kerry Ingredients, Gold Dipt Coating Division sold under the designation ABC #E5005. The battered and breaded fish portions are then either frozen raw or par fried for 30 seconds at 390° F. using a Stein continuous fryer and then frozen. The raw frozen fish portions are reconstituted for consumption by deep fat frying in a 50 pound Stein batch fryer for 4 minutes at 350° F. The oil level of this product is 11 grams of fat per 100 grams of product. The par fried fish portions are reconstituted for consumption by deep fat frying in a 50 pound Stein batch fryers for 4 minutes at 350° F. The oil level of this product is 15 grams of fat per 100 grams of product. The par fried fish portions are reconstituted for consumption by baking in a convection oven for 12 minutes at 450° F. The oil level of this product is 8 grams of fat per 100 grams of product.

EXAMPLE #2

Pectin Treated Battered and Breaded Fish Portions

Calcium Dry Blended into American Bread Crumb

Tempered frozen fish portions are dusted with a pre-dust composition typical in the industry and then dipped in a commercially available adhesion batter (Kerry Ingredients, Golden Dipt Coating Division designation #G6046) using a Stein batter application unit. The battered fish portion is then coated with bread crumbs (Kerry Ingredients, Golden Dipt Coating Division designation ABC#J0570-T02) into which calcium chloride has been dry blended at a level of 1200 mg per pound of crumbs.

After breading, the fish portions are immersed into a 1.0% aqueous solution of calcium reactive pectin at 70° F. for 5 seconds. A pectin manufactured by the Copenhagen Pectin Division of Hercules Incorporated, LM 1912CSZ, has been found suitable for this purpose. During the pectin 5 second dip, the food product will typically absorb approximately 0.35 to 0.55 grams of pectin per 100 square centimeters of battered and breaded surface area. However, it should be noted that the amount of pectin solution absorbed/adsorbed is a surface to volume phenomenon, i.e., the higher the surface area of the food product, the more pectin [or calcium] which will be absorbed.

Subsequent to the pectin dip, the battered and breaded fish portions are then either frozen raw or par fried for 30 seconds at 390° F. using a Stein continuous fryer and then frozen. The raw frozen fish portions are reconstituted for consumption by deep fat frying in a 50 pound Stein batch fryer for 4 minutes at 350° F. The oil level of this product is 8.5 grams of fat per 100 grams of product The par fried fish portions are reconstituted for consumption by deep fat frying in a 50 pound Stein batch fryer for 4 minutes at 350° F. The oil level of this product is 12 grams of fat per 100 grams of product. The par fried fish portions are reconstituted for consumption by baking in a convection oven for 12 minutes at 450° F. The oil level of this product is 5.6 grams of fat per 100 grams of product.

EXAMPLE #3

Pectin Treated Battered and Breaded Fish Portions

Calcium Sprayed on American Bread Crumb

Tempered frozen fish portions are dusted with a pre-dust composition typical in the industry and then dipped in a commercially available adhesion batter (Kerry Ingredients, Golden Dipt Coating Division designation #G6046) using a Stein batter application unit. The battered fish portion is then coated with bread crumbs (Kerry Ingredients, Golden Dipt Coating Division designation ABC #J0570T03) into which calcium chloride had been spray coated so that there is deposited in the bread crumbs approximately 1200 mg per pound of crumbs. After breading, the fish portions are immersed into a 1.0% aqueous solution of calcium reactive pectin at 70° F. for 5 seconds. A pectin manufactured by the Copenhagen Pectin Division of Hercules Incorporated, LM 1912CSZ, has been found suitable for this purpose. During the pectin 5 second dip, the food product will typically absorb approximately 0.35 to 0.55 grams of pectin per 100 square centimeters of battered and breaded surface area.

The battered and breaded fish portions are then either frozen raw or par fried for 30 seconds at 390° F. using a Stein continuous fryer and then frozen. The raw frozen fish portions are reconstituted for consumption by deep fat frying in a 50 pound Stein batch fryer for 4 minutes at 350° F. The oil level of this product is 7.6 grams of fat per 100 grams of product. The par fried fish portions are reconstituted for consumption by deep fat frying in a 50 pound Stein batch fryer for 4 minutes at 350° F. The oil level of this product is 9.8 grams of fat per 100 grams of product. The par fried fish portions are reconstituted for consumption by baking in a convection oven for 12 minutes at 450° F. The oil level of this product is 5.5 grams of fat per 100 grams of product.

EXAMPLE #4

Pectin Treated Battered and Breaded Fish Portions

Calcium Baked-in into American Bread Crumb

Tempered frozen fish portions are dusted with a pre-dust composition typical in the industry and then dipped in a commercially available adhesion batter (Kerry Ingredients, Golden Dipt Coating Division designation #G6046) using a Stein batter application unit. The battered fish portion is then coated with bread crumbs (Kerry Ingredients, Golden Dipt Coating Division designation ABC #J0570-T01) into which calcium chloride had been baked at a level of 1200 mg per pound of crumbs. After breading, the fish portions are immersed into a 1.0% aqueous solution of calcium reactive pectin at 70° F. for 5 seconds. A pectin manufactured by the Copenhagen Pectin Division of Hercules Incorporated, LM 1912CSZ, has been found suitable for this purpose. During the pectin 5 second dip, the food product will typically absorb approximately 0.35 to 0.55 grams of pectin per 100 square centimeters of battered and breaded surface area. The battered and breaded fish portions are then either frozen raw or par fried for 30 seconds at 390° F. using a Stein continuous fryer and then frozen. The raw frozen fish portions are reconstituted for consumption by deep fat frying in a 50 pound Stein batch fryer for 4 minutes at 350° F. The oil level of this product is 4.3 grams of fat per 100 grams of product. The par fried fish portions are reconstituted for consumption by deep fat frying in a 50 pound Stein batch fryer for 4 minutes at 350° F. The oil level of this product is 7.5 grams of fat per 100 grams of product. The par fried fish portions are reconstituted for consumption by baking in a convection oven for 12 minutes at 450° F. The oil level of this product is 7.2 grams of fat per 100 grams of product.

EXAMPLE #5

Pectin Treated Battered and Breaded Fish Portions

Calcium Baked-in into Japanese Bread Crumb

Tempered frozen fish portions are dusted with a pre-dust composition typical in the industry and then dipped in a commercially available adhesion batter (Kerry Ingredients, Golden Dipt Coating Division designation #G6046) using a Stein batter application unit. The battered fish portion is then coated with bread crumbs (Kerry Ingredients, Golden Dipt Coating Division designation CM #J0795-TO1) into which calcium chloride had been baked at a level of 1200 mg per pound of crumbs. After breading, the fish portions are immersed into a 1.0% aqueous solution of calcium reactive pectin at 70° F. for 3–5 seconds. A pectin manufactured by the Copenhagen Pectin Division of Hercules Incorporated, LM 1912CSZ, has been found suitable for this purpose. During the pectin 5 second dip, the food product will typically absorb approximately 0.35 to 0.55 grams of pectin per 100 square centimeters of battered and breaded surface area. The battered and breaded fish portions are then either frozen raw or par fried for 30 seconds at 390° F. using a Stein continuous fryer and then frozen. The raw frozen fish portions are reconstituted for consumption by deep fat frying in a 50 pound Stein batch fryer for 4 minutes at 350° F. The oil level of this product is 8.7 grams of fat per 100 grams of product compared to an oil level of 11% for an untreated product. The oil level of this product is 6.6 grams of fat per 100 grams of product compared to an oil level of 9.1% for an untreated product. The par fried fish portions are reconstituted for consumption by baking in a convection oven for 12 minutes at 450° F.

EXAMPLE #6

Pectin Treated Battered and Breaded Fish Portions

Calcium Baked-in Cracker Meal

Tempered frozen fish portions are dusted with a pre-dust composition typical in the industry and then dipped in a commercially available adhesion batter (Kerry Ingredients, Golden Dipt Coating Division designation #G6046) using a Stein batter application unit. The battered fish portion is then coated with bread crumbs (Kerry Ingredients, Golden Dipt Coating Division designation CM #J0795-T01) into which calcium chloride has been baked at a level of 1200 mg per pound of crumbs. After breading, the fish portions are immersed into a 1.0% aqueous solution of calcium reactive pectin at 70° F. for 3–5 seconds. A pectin manufactured by the Copenhagen Pectin Division of Hercules Incorporated, LM 1912CSZ, has been found suitable for this purpose. During the pectin 5 second dip, the food product will typically absorb approximately 0.35 to 0.55 grams of pectin per 100 square centimeters of battered and breaded surface area. The battered and breaded fish portions are then either frozen raw or par fried for 30 seconds at 390° F. using a Stein continuous fryer and then frozen. The raw frozen fish portions are reconstituted for consumption by deep fat frying in a 50 pound Stein batch fryer for 4 minutes at 350° F. The oil level of this product is 4.2 grams of fat per 100 grams of product compared to an oil level of 8% for an untreated product. The par fried fish portions are reconstituted for consumption by deep fat frying in a 50 pound Stein batch fryer for 4 minutes at 350° F. The oil level of this product is 3.55 grams of fat per 100 grams of product.

EXAMPLE #7

Chicken Portions

Control

Tempered frozen chicken tenders are dusted with a pre-dust composition typical in the industry and then dipped in a commercially available adhesion batter for example, from Kerry Ingredients, Golden Dipt Coating Division designation #G7108 using a Stein batter application unit. The battered chicken tender is then coated with commercially available bread crumbs (Kerry Ingredients, Golden Dipt Coating Division designation ABC #E5005). The battered and breaded chicken tenders are then either frozen raw or par fried for 30 seconds at 390° F. using a Stein continuous fryer and then frozen. The raw frozen chicken tenders are reconstituted for consumption by deep fat frying in a 50 pound Stein batch fryer for 4 minutes at 350° F. The oil level of this product is 9.4 grams of fat per 100 grams of product. The par fried chicken tenders are reconstituted for consumption by baking in a convection oven for 12 minutes at 450° F. The oil level of this product is 7.2 grams of fat per 100 grams of product.

EXAMPLE #8

Pectin Treated Battered and Breaded Chicken Portions

Calcium Baked-in into American Bread Crumb

Tempered frozen chicken tenders are dusted with a pre-dust composition typical in the industry and then dipped in a commercially available adhesion batter (Kerry Ingredients, Golden Dipt Coating Division designation #G7108) using a Stein batter application unit. The battered chicken tender is then coated with commercially available bread crumbs (Kerry Ingredients, Golden Dipt Coating Division designation ABC #J0570-T01) into which calcium chloride has been baked at a level of 1200 mg per pound of crumbs. After breading, the chicken tenders are immersed into a 1.0% aqueous solution of calcium reactive pectin at 70° F. for 3–5 seconds. A pectin manufactured by the Copenhagen Pectin Division of Hercules Incorporated, LM 1912CSZ, has been found suitable for this purpose. During the pectin 5 second dip, the food product will typically absorb approximately 0.35 to 0.55 grams of pectin per 100 square centimeters of battered and breaded surface area. The battered and breaded chicken tenders are then either frozen raw or par fried for 30 seconds at 390° F. using a Stein continuous fryer and then frozen. The raw frozen chicken tenders are reconstituted for consumption by deep fat frying in a 50 pound Stein batch fryer for 4 minutes at 350° F. The oil level of this product is 6.8 grams of fat per 100 grams of product. The par fried chicken tenders are reconstituted for consumption by baking in a convection oven for 12 minutes at 450° F. The oil level of this product is 5.8 grams of fat per 100 grams of product.

EXAMPLE #9

Pectin Treated Battered and Breaded Chicken Portions

Calcium Baked-in into Japanese Bread Crumb

Tempered frozen chicken tenders are dusted with a pre-dust composition typical in the industry and then dipped in a commercially available adhesion batter (Kerry Ingredients, Golden Dipt Coating Division designation #G7108) using a Stein batter application unit. The battered chicken tender is then coated with commercially available bread crumbs (Kerry Ingredients, Golden Dipt Coating Division designation JBC #J0739-T01) into which calcium chloride has been baked at a level of 1200 mg per pound of crumbs. After breading, the chicken tenders are immersed into a 1.0% aqueous solution of calcium reactive pectin at 70° F. for 3–5 seconds. A pectin manufactured by the Copenhagen Pectin Division of Hercules incorporated, LM 1912CSZ, has been found suitable for this purpose. During the pectin 5 second dip, the food product will typically absorb approximately 0.35 to 0.55 grams of pectin per 100 square centimeters of battered and breaded surface area. The battered and breaded chicken tenders are then either frozen raw or par fried for 30 seconds at 390° F. using a Stein continuous fryer and then frozen. The raw frozen chicken tenders are reconstituted for consumption by deep fat frying in a 50 pound Stein batch fryer for 4 minutes at 350° F. The oil level of this product is 8.7 grams of fat per 100 grams of product compared to an oil level of 13% for an untreated control. The par fried chicken tenders are reconstituted for consumption by baking in a convection oven for 12 minutes at 450° F. The oil level of this product is 7.2 grams of fat per 100 grams of product compared to an oil level of 10% for an untreated product.

EXAMPLE #10

Pectin Treated Battered and Breaded Chicken Portions

Calcium Baked-in into Cracker Meal

Tempered frozen chicken tenders are dusted with a pre-dust composition typical in the industry and then dipped in a commercially available adhesion batter (Kerry Ingredients, Golden Dipt Coating Division designation #G7108) using a Stein batter application unit. The battered chicken tender is then coated with commercially available bread crumbs (Kerry Ingredients, Golden Dipt Coating Division designation CM #J0795-T01) into which calcium chloride has been baked at a level of 1200 mg per pound of crumbs. After breading, the chicken tenders are immersed into a 1.0% aqueous solution of calcium reactive pectin at 70° F. for 3–5 seconds. The battered and breaded chicken tenders are then either frozen raw or par fried for 30 seconds at 390° F. using a Stein continuous fryer and then frozen. The raw frozen chicken tenders are reconstituted for consumption by deep fat frying in a 50 pound Stein batch fryer for 4 minutes at 350° F. The oil level of this product is 6.3 grams of fat per 100 grams of product compared to an oil level of 10.5% for an untreated product. The par fried chicken tenders are reconstituted for consumption by baking in a convection oven for 12 minutes at 450° F. The oil level of this product is 4.7 grams of fat per 100 grams of product compared to an oil level of 7.2% for an untreated product.

EXAMPLE #11

Vegetable Pieces

Control

Tempered frozen zucchini coins are dusted with a pre-dust composition typical in the industry and then dipped in a commercially available adhesion batter (Kerry Ingredients, Golden Dipt Coating Division designation #G7108) using a Stein batter application unit. The battered zucchini coin is then coated with commercially available bread crumbs for example from Kerry Ingredients, Golden Dipt Coating Division sold under the designation ABC #E5005. The battered and breaded zucchini coins are then either frozen raw or par fried for 30 seconds at 390° F. using a Stein continuous fryer and then frozen. The raw frozen zucchini coins are reconstituted for consumption by deep fat frying in a 50 pound Stein batch fryer for 2 minutes at 350°F. The oil level of this product is 11.6 grams of fat per 100 grams of product. The par fried zucchini coins are reconstituted for consumption by baking in a convection oven for 8 minutes at 450° F. The oil level of this product is 10.1 grams of fat per 100 grams of product.

EXAMPLE #12

Pectin Treated Battered and Breaded Vegetable Piece

Calcium Baked-in into American Bread Crumb

Tempered frozen zucchini coins are dusted with a pre-dust composition typical in the industry and then dipped in a commercially available adhesion batter (Kerry Ingredients, Golden Dipt Coating Division designation #G7108) using a Stein batter application unit. The battered zucchini coin is then coated with commercially available bread crumbs (Kerry Ingredients, Golden Dipt Coating Division designation ABC #J0570-T01 ) into which calcium chloride has been baked at a level of 1200 mg per pound of crumbs. After breading, the zucchini coins are immersed into a 1.0% aqueous solution of calcium reactive pectin at 70° F. for 3–5 seconds. The battered and breaded zucchini coins are then either frozen raw or par fried for 30 seconds at 390° F. using a Stein continuous fryer and then frozen. The raw frozen zucchini coins are reconstituted for consumption by deep fat frying in a 50 pound Stein batch fryer for 2 minutes at 350° F. The oil level of this product is 6.9 grams of fat per 100 grams of product. The par fried zucchini coins are reconstituted for consumption by baking in a convection oven for 8 minutes at 450° F. The oil level of this product is 7.2 grams of fat per 100 grams of product.

EXAMPLE #13

Pectin Treated Battered and Breaded Vegetable Portions

Calcium Baked-in into Cracker Meal

Tempered frozen zucchini coins are dusted with a pre-dust composition typical in the industry and then dipped in a commercially available adhesion batter (Kerry Ingredients, Golden Dipt Coating Division designation #G7108) using a Stein batter application unit. The battered zucchini coin is then coated with commercially available bread crumbs (Kerry Ingredients, Golden Dipt Coating Division CM #J0795-T01) into which calcium chloride has been baked at a level of 1200 mg per pound of crumbs. After breading, the zucchini coins are immersed into a 1.0% aqueous solution of calcium reactive pectin at 70° F. for 3–5 seconds. The battered and breaded zucchini coins are then either frozen raw or par fried for 30 seconds at 390° F. using a Stein continuous fryer and then frozen. The raw frozen zucchini coins are reconstituted for consumption by deep fat frying in a 50 pound Stein batch fryer for 2 minutes at 350° F. The oil level of this product is 5.4 grams of fat per 100 grams of product compared to an oil level of 10.9% for an untreated product. The par fried zucchini coins are reconstituted for consumption by baking in a convection oven for 8 minutes at 450° F. The oil level of this product is 6.6 grams of fat per 100 grams of product compared to an oil level of 9.9% for an untreated product.

In addition to the various examples shown above, the application of the calcium chloride and pectin can vary on the order in which each is applied and how each component is applied. For example, the pectin may be applied to the food product and baked in, followed by dipping the product in an appropriate calcium solution dip.

Table A shows the percent fat reduced as shown in Examples 1–13, in accordance with the present invention.

TABLE A

PERCENT FAT REDCUED

| EXAMPLE NUMBER | PRODUCT DESCRIPTION* | FAT % CONTROL | FAT % TEST | % FAT REDUCTION |
|---|---|---|---|---|
| 1 & 2 | Fish/ABC/RB/DB | 8.0% | 5.6% | 30.0% |
| 1 & 2 | Fish/ABC/PF/DB | 11.0% | 8.5% | 22.7% |
| 1 & 3 | Fish/ABC/RB/SD | 8.0% | 5.5% | 31.3% |
| 1 & 3 | Fish/ABC/PF/SD | 11.0% | 7.6% | 30.0% |
| 1 & 4 | Fish/ABC/RB/BK | 8.0% | 4.3% | 46.3% |
| 1 & 4 | Fish/ABC/PF/BK | 11.0% | 7.2% | 34.5% |
| 5 | Fish/JBC/RB/BK | 11.0% | 8.7% | 20.9% |
| 5 | Fish/JBC/PF/BK | 9.1% | 6.6% | 27.5% |
| 6 | Fish/CM/RB/BK | 8.0% | 4.2% | 47.5% |
| 6 | Fish/CM/PF/BK | 6.0% | 3.6% | 40.0% |
| 7 & 8 | Chic/ABC/RB/BK | 9.4% | 6.8% | 27.7% |
| 7 & 8 | Chic/ABC/PF/BK | 7.2% | 5.8% | 19.5% |
| 9 | Chic/JBC/RB/BK | 13.0% | 8.7% | 33.1% |
| 9 | Chic/JBC/PF/BK | 10.0% | 7.2% | 28.0% |
| 10 | Chic/CM/RB/BK | 10.5% | 6.3% | 40.0% |
| 10 | Chic/CM/RB/BK | 7.2% | 4.7% | 34.5% |
| 11 & 12 | Zucc/ABC/RB/BK | 11.6% | 6.9% | 40.5% |
| 11 & 12 | Zucc/ABC/PF/BK | 10.1% | 7.2% | 28.7% |
| 13 | Zucc/CM/RB/BK | 10.9% | 5.4% | 50.5% |
| 13 | Zucc/CM/PF/BK | 9.9% | 6.6% | 33.3% |

*ABC = American Bread Crumb, CM = Cracker Meal, JBC = Japanese Bread Crumb
RB = Raw Breaded, fried back; PF = Prefired, baked back
DB = Dry blended Calcium Chloride in breader.
SD = Spray dried calcium chloride on bread
BK = Baked in Clacium Chloride in breader.

Without further elaboration the foregoing will so fully illustrate our invention that others may, by applying current or future knowledge, adapt the same for use under various conditions of service.

What is claimed is:

1. A method of inhibiting oil absorption/adsorption of a food product cooked in the oil, the method comprising the following steps:
   a) coating a foodstuff with a batter composition to produce a batter-coated foodstuff;
   b) coating the batter-coated foodstuff with a calcium salt enriched crumb composition to obtain a batter and crumb-coated food product wherein the calcium salt is dispersed throughout the crumb composition; and c) applying an aqueous solution of calcium reactive pectin to the batter and crumb-coated food product wherein the calcium salt and the pectin interact to form a calcium pectin film on the surface of the crumb composition.

2. A method of inhibiting oil absorption/adsorption of a food product cooked in the oil, the method comprising the steps of:
a) coating a foodstuff with a batter composition including a calcium salt to produce a batter-coated foodstuff; and
b) coating the batter-coated foodstuff with a crumb composition comprising a calcium reactive pectin wherein the pectin is dispersed throughout the crumb composition, to obtain a batter and crumb-coated food product resulting in the interaction of the calcium salt and the pectin at the interface between the crumb composition and the batter-coated foodstuff to form a calcium reactive film on the surface of the crumb composition.

3. A method of inhibiting oil absorption/adsorption of a food product cooked in the oil, the method comprising the following steps:
a) coating a foodstuff with a batter composition including a calcium reactive pectin to produce a batter-coated foodstuff; and
b) coating the batter-coated foodstuff with a calcium salt enriched crumb composition to obtain a batter and crumb-coated food product having a calcium pectin film resulting from the interaction of the calcium reactive pectin and the calcium salt at the interface between the crumb composition and the batter coated foodstuff.

4. A method of inhibiting oil absorption/adsorption of a food product cooked in the oil, the method comprising the steps of:
a) coating a foodstuff with a batter composition to produce a batter coated foodstuff;
b) coating the batter-coated foodstuff with a crumb composition comprising a calcium reactive pectin to obtain a batter and crumb-coated food product wherein the pectin is dispersed throughout the crumb composition; and
c) applying an aqueous solution of a calcium salt to the batter and crumb-coated food product resulting in the interaction of the calcium reactive pectin and the calcium salt on the surface of the crumb composition to form a calcium reactive film.

5. The method of any one of claims 1 to 4 carried out without a separate drying step.

6. The method of claim 1, additionally comprising the step of selecting the calcium reactive pectin to comprise pectin having a structural formula as shown in FIG. 1.

7. The method of claim 1, additionally comprising the step of selecting the crumb composition to comprise bread crumbs, american bread crumbs, Japanese bread crumbs, cracker meal and combinations thereof.

8. The method of claim 1, additionally comprising the step of selecting the calcium salt from the group consisting of calcium chloride, calcium citrate, calcium phosphate and water soluble calcium salts.

9. The method of claim 1, additionally comprising the step of selecting the amount of calcium ion to be applied to the food product to be 50 to 1000 mg per gram of pectin applied to the food product.

10. The method of claim 1, additionally comprising the step of selecting the amount of calcium iron to be applied to the food product to be 200 to 800 mg per gram of pectin applied to the food product.

11. The method of claim 1, additionally comprising the step of selecting the amount of calcium ion to be applied to the food product to be 400 to 600 mg per gram of pectin applied to the food product.

12. The method of claim 1, additionally comprising the step of selecting the pectin to comprise a low methoxy pectin, an amidated low methoxy pectin and combinations thereof.

13. The method of claim 12 additionally comprising the step of selecting the low methoxy pectin to have a degree of esterification in the range 0 to 40%.

14. The method of claim 12 additionally comprising the step of selecting the low methoxy pectin to have a degree of esterification in the range 0 to 25%.

15. The method of claim 12 additionally comprising the step of selecting the low methoxy pectin to have a degree of esterification in the range 0 to 15%.

16. The method of claim 12 additionally comprising the step of selecting the low methoxy pectin to have a molecular weight of greater than 50,000 daltons.

17. The method of claim 13 additionally comprising the step of selecting the low methoxy pectin to have a molecular weight of greater than 50,000 daltons.

18. The method of claim 14 additionally comprising the step of selecting the low methoxy pectin to have a molecular weight of greater than 50,000 daltons.

19. The method of claim 15 additionally comprising the step of selecting the low methoxy pectin to have a molecular weight of greater than 50,000 daltons.

20. The method of claim 12 additionally comprising the step of selecting the low methoxy pectin to have a molecular weight of greater than 100,000 daltons.

21. The method of claim 13 additionally comprising the step of selecting the low methoxy pectin to have a molecular weight of greater than 100,000 daltons.

22. The method of claim 14 additionally comprising the step of selecting the low methoxy pectin to have a molecular weight of greater than 100,000 daltons.

23. The method of claim 15 additionally comprising the step of selecting the low methoxy pectin to have a molecular weight of greater than 100,000 daltons.

24. The method of claim 12 additionally comprising the step of selecting the low methoxy pectin to have a molecular weight of greater than 150,000 daltons.

25. The method of claim 13 additionally comprising the step of selecting the low methoxy pectin to have a molecular weight of greater than 150,000 daltons.

26. The method of claim 14 additionally comprising the step of selecting the low methoxy pectin to have a molecular weight of greater than 150,000 daltons.

27. The method of claim 15 additionally comprising the step of selecting the low methoxy pectin to have a molecular weight of greater than 150,000 daltons.

28. The method of claim 1, additionally comprising the step of selecting the pectin to comprise a pectin having a high calcium reactivity.

29. The method of claim 1, additionally comprising the step of par frying or freezing the food product.

30. A food product made in accordance with the method of claim 1.

31. The method of claim 2 additionally comprising the step of selecting the calcium reactive pectin to comprise a pectin having a structural formula as shown in FIG. 1.

32. The method of claim 2 additionally comprising the step of selecting the crumb composition to comprise bread crumbs, american bread crumbs, Japanese bread crumbs, cracker meal and combinations thereof.

33. The method of claim 2 additionally comprising the step of selecting the calcium salt from the group consisting of calcium chloride, calcium citrate, calcium phosphate and water soluble calcium salts.

34. The method of claim 2 additionally comprising the step of selecting the amount of calcium ion to be applied to the food product to be 50 to 1,000 mg per gram of pectin applied to the food product.

35. The method claim 2 additionally comprising the step of selecting the amount of calcium ion to be applied to the food product to be 200 to 800 mg per gram of pectin applied to the food product.

36. The method of claim 2 additionally comprising the step of selecting the amount of calcium ion to be applied to the food product to be 400 to 600 mg per gram of pectin applied to the food product.

37. The method of claim 2 additionally comprising the step of selecting the pectin to comprise a low methoxy pectin, an amidated low methoxy pectin and combinations thereof.

38. The method of claim 2 additionally comprising the step of selecting the pectin to comprise a pectin having a high calcium reactivity.

39. The method of claim 2 additionally comprising the step of par frying or freezing the food product.

40. A food product made in accordance with the method of claim 2.

41. The method of claim 3 additionally comprising the step of selecting the calcium reactive pectin to comprise a pectin having a structural formula as shown in FIG. 1.

42. The method of claim 3 additionally comprising the step of selecting the crumb composition to comprise bread crumbs, american bread crumbs, Japanese bread crumbs, cracker meal and combinations thereof.

43. The method of claim 3 additionally comprising the step of selecting the calcium salt from the group consisting of calcium chloride, calcium citrate, calcium phosphate and water soluble calcium salts.

44. The method of claim 3 additionally comprising the step of selecting the amount of calcium ion to be applied to the food product to be 50 to 1000 mg per gram of pectin applied to the food product.

45. The method claim 3 additionally comprising the step of selecting the amount of calcium ion to be applied to the food product to be 200 to 800 mg per gram of pectin applied to the food product.

46. The method of claim 3 additionally comprising the step of selecting the amount of calcium ion to be applied to the food product to be 400 to 600 mg per gram of pectin applied to the food product.

47. The method of claim 3 additionally comprising the step of selecting the pectin to comprise a low methoxy pectin, an amidated low methoxy pectin and combinations thereof.

48. The method of claim 3 additionally comprising the step of selecting the pectin to comprise a pectin having a high calcium reactivity.

49. The method of claim 3 additionally comprising the step of par frying or freezing the food product.

50. A food product made in accordance with the method of claim 3.

51. The method of claim 4 additionally comprising the step of selecting the calcium reactive pectin to comprise a pectin having a structural formula as shown in FIG. 1.

52. The method of claim 4 additionally comprising the step of selecting the crumb composition to comprise bread crumbs, american bread crumbs, Japanese bread crumbs, cracker meal and combinations thereof.

53. The method of claim 4 additionally comprising the step of selecting the calcium salt from the group consisting of calcium chloride, calcium citrate, calcium phosphate and water soluble calcium salts.

54. The method of claim 4 additionally comprising the step of selecting the amount of calcium ion to be applied to the food product to be 50 to 1000 mg per gram of pectin applied to the food product.

55. The method claim 4 additionally comprising the step of selecting the amount of calcium ion to be applied to the food product to be 200 to 800 mg pr gram of pectin applied to the food product.

56. The method of claim 4 additionally comprising the step of selecting the amount of calcium ion to be applied to the food product to be 400 to 600 mg per gram of pectin applied to the food product.

57. The method of claim 4 additionally comprising the step of selecting the pectin to comprise a low methoxy pectin, an amidated low methoxy pectin and combinations thereof.

58. The method of claim 4 additionally comprising the step of selecting the pectin to comprise a pectin having a high calcium reactivity.

59. The method of claim 4 additionally comprising the step of par frying or freezing the food product.

60. A food product made in accordance with the method of claim 4.

\* \* \* \* \*